(12) United States Patent
Gandouet et al.

(10) Patent No.: US 12,499,489 B2
(45) Date of Patent: Dec. 16, 2025

(54) SYSTEM AND METHOD FOR DETERMINING A DRIVER SCORE USING MACHINE LEARNING

(71) Applicant: THE TORONTO-DOMINION BANK, Toronto (CA)

(72) Inventors: Olivier Gandouet, Montreal (CA); Jean-Christophe Bouëtté, Montreal (CA); Ghaith Kazma, Laval (CA); Maxime Lafleur-Forcier, Boucherville (CA); Linda Aida, Longueuil (CA)

(73) Assignee: THE TORONTO-DOMINION BANK, Toronto (CA)

( * ) Notice: Subject to any disclaimer, the term of this patent is extended or adjusted under 35 U.S.C. 154(b) by 162 days.

(21) Appl. No.: 17/473,827

(22) Filed: Sep. 13, 2021

(65) Prior Publication Data

US 2023/0083899 A1   Mar. 16, 2023

(51) Int. Cl.
*G06Q 40/08* (2012.01)
*B60W 40/09* (2012.01)
*G06F 18/28* (2023.01)
*G06N 20/20* (2019.01)
*H04W 4/029* (2018.01)

(52) U.S. Cl.
CPC ............ *G06Q 40/08* (2013.01); *B60W 40/09* (2013.01); *G06F 18/28* (2023.01); *G06N 20/20* (2019.01); *H04W 4/029* (2018.02); *B60W 2756/10* (2020.02)

(58) Field of Classification Search
CPC ....... G06Q 40/08; B60W 40/09; H04W 4/029
See application file for complete search history.

(56) References Cited

U.S. PATENT DOCUMENTS

| | | | | |
|---|---|---|---|---|
| 8,566,126 | B1* | 10/2013 | Hopkins, III | G08G 1/09 340/439 |
| 10,915,964 | B1* | 2/2021 | Purgatorio | G06Q 40/08 |
| 11,068,993 | B1* | 7/2021 | Noorani | G06N 20/00 |
| 2015/0228128 | A1* | 8/2015 | Parameshwaran | G07C 5/085 340/439 |
| 2019/0263417 | A1* | 8/2019 | Rau | H04W 4/90 |

(Continued)

OTHER PUBLICATIONS

Wu, Guan-Jhin, "Application of eXtreme gradient boosting trees in the construction of credit risk assessment models for financial institutions," Oct. 5, 2018 (Year: 2018).*

*Primary Examiner* — Matthew S Gart
*Assistant Examiner* — William D Newlon

(57) ABSTRACT

A computer-implemented system and method is provided for determining a risk assessment. The method comprises receiving a plurality of vehicle behaviour data over a defined data collection period. This data is input into a supervised learning prediction model which is trained on historical vehicle behaviour data over a past time period, to generate a predicted value of a frequency of expected claim submissions for the policyholder of the vehicle in a future time period. Then a Shapley estimate is computed for each feature of the behaviour data applied to the model for determining a contribution of each said feature to the predicted value. A spline approximation is applied to the Shapley estimate for each said feature to estimate the contribution of each said feature. Then, a sum of the spline approximation for each said feature is calculated and a corresponding risk score determined based on the sum.

22 Claims, 12 Drawing Sheets

(56) References Cited

U.S. PATENT DOCUMENTS

| | | | |
|---|---|---|---|
| 2020/0134735 A1* | 4/2020 | Carver | G06Q 40/08 |
| 2021/0158227 A1* | 5/2021 | Budzik | G06N 5/01 |
| 2021/0272207 A1* | 9/2021 | Fields | G08G 1/096725 |
| 2021/0383275 A1* | 12/2021 | Miroshnikov | G06F 18/24137 |
| 2022/0005041 A1* | 1/2022 | Chang | G06F 18/24 |
| 2022/0122171 A1* | 4/2022 | Hubard | G06Q 40/03 |
| 2022/0194404 A1* | 6/2022 | Fu | B60W 40/09 |
| 2023/0273045 A1* | 8/2023 | Chintakindi | G01C 21/3691 |
| | | | 701/412 |

* cited by examiner

SYSTEM AND METHOD FOR DETERMINING A DRIVER SCORE USING MACHINE LEARNING

FIELD

The present disclosure generally relates to a system and method for determining a driver risk of a policyholder's vehicle using machine learning and particularly, for dynamically evaluating and assigning a risk score for the driver's safety rating based on driver features.

BACKGROUND

Usage based insurance (UBI) also known as pay as you drive or pay as you go service is an insurance program that, measures how a car is driven and collects data for insurers on how drivers are using their cars (e.g. braking and accelerating, how far the car is driven, how long they're driving, etc.). The collected data is sent to an insurance company to assess the risk profile for a specific driver to give discounts or rewards.

Generally the insurers attempt to determine how safe a driver is when driving in order to determine how many claims they are likely to make. This is traditionally a manual process or a rule based system. However, traditional methods for evaluating a driver's safety rating fail to take a holistic view of the various aspects of the driver. These methods involve a cumulative scoring (or penalization) over the course of a given trip for various observed driving events (i.e., −3 score for braking, −3 score for speeding, −3 for long driving distance, etc.). There are two problems with this method of evaluation: first, the method directly penalizes drivers that have longer trips, and second, each aspect of the data is looked at without analysis of the other aspects of how the user is driving. Also, there is little understanding of how this risk score correlates with claim frequency.

Generally, existing methods for scoring a vehicle driver involve assigning an arbitrary score of 100 at the beginning of a trip to a driver, and subtracting from that score each time the driver performed a specific action considered to be problematic such as accelerating, braking, cornering, or speeding. Initially, this method fails to provide a big picture effect of the actions as it considers each event on its own without consideration to the combination of events. Additionally, one effect of this method of scoring is that drivers on longer trips are penalized more as they will necessarily perform these actions more often and therefore receive a lower score than drivers on a shorter trip. Thus, drivers on longer trips would be penalized even if they did not necessarily drive in a less safe manner than drivers on a shorter trip. Thus, this is an inaccurate measure of safety rating. Another problem is that there is no understanding of how or whether these types of events may actually result in a claim submission to a policyholder's insurance company. Thus, these existing methods of assessing risk based on the above identified data captured leads to inefficient and erroneous determination of risk that may be unfairly biased towards certain drivers over others. Prior methods of risk management and evaluating a driver's safety were based on cumulative scores from individual driver events that inaccurately reflected driver safety and had little correlation with future claims.

Accordingly, there exists a need to obviate or mitigate at least some of the above-mentioned disadvantages of existing risk management systems and methods for determining risk scores. Notably, there is a need to be able to accurately and dynamically assess driver risk and score a driver's driving abilities in order to predict a likelihood of the driver making a related insurance claim in the future.

SUMMARY

Disclosed embodiments provide systems and methods for providing a risk assessment for a policyholder's vehicle using data gathered electronically via telematics to determine features of the user's driving behavior and/or interaction of the driver with a computer application (e.g. deletion of trips performed, deletion or modification of driver profile, etc.) that provides risk profiles based on the gathered driving information.

In one embodiment, the present disclosure aims to address the problems by developing a score that incorporates weighting learned from a machine learning prediction model, such as an extreme boosted gradient model (XG-Boost) trained to input driver features and output expected claim frequency for a future time period. This weighting provides a holistic measure of the effects of each feature on the overall risk for the driver by determining influence of each driver feature with respect to all other driver features observed and input into the prediction model, and using the influence measure as a way to calculate a risk score that is correlated to expected claim frequency occurring in a future time (e.g. expected claim submissions in the next month based on prior claim submission in the last month). Thus, the proposed systems and methods, provide a more accurate safety score across different types of trips, e.g. irrespective of length.

In at least some embodiment, the risk assessment system and method provided analyzes a number of features, including how often the user drives, where the user drives, how the user drives, and whether the user decides to delete or modify certain trips from their driving log on the system (e.g. via a computer application on a mobile device of the user for viewing the risk score and the driver's profile).

According to an aspect of the present disclosure there is provided a risk assessment server configured to provide a risk assessment for a policyholder's vehicle, the server communicating with one or more mobile device(s) on and/or communicatively connected to the vehicle and comprising: a computer processor; and a non-transitory computer-readable storage medium storing instructions that when executed by the computer processor perform actions comprising: receiving a plurality of vehicle behaviour data from the mobile device associated with the vehicle aggregated over a defined data collection period, the vehicle behaviour data comprising a plurality of features relating to operating the vehicle over a defined data collection period, at least some of the features captured from a geo-tracking system on the mobile device while driving the vehicle; providing the vehicle behaviour data to a supervised learning prediction model, the prediction model being trained on historical vehicle behaviour data over a past time period, to generate a predicted value of a frequency of expected claim submissions submitted to an entity managing a policy of the policyholder's vehicle in a future time period; computing a Shapley estimate value for each feature of the vehicle behaviour data applied to the prediction model for determining a contribution of each said feature to the predicted value, wherein the Shapley estimate value for each said feature is determined by performing a spline approximation to an output of a Shapley function applied to each said feature to estimate the contribution of each said feature; and, generating an output of a sum of the Shapley estimate value for each said feature, the sum being correlated directly to a risk score for the risk assessment and instructing the one or more mobile device(s) associated with the vehicle(s) to display the risk score on a risk assessment computer application storing a profile for the policyholder's vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features. In operation of the risk assessment server, computing the Shapley estimate value may include: applying the Shapley function to each said feature relative to all the other features in the plurality of features, the Shapley function providing an average expected marginal contribution of each said feature for generating a Shapley local approximation for each said feature; applying the spline approximation to the Shapley local approximation to generate a spline representation having a plurality of coefficients defining a spline curve; and, computing a sum of the coefficients to generate the sum of the Shapley estimate value. The vehicle behaviour data further may include: usage characteristics of the risk assessment computer application, associated with the policyholder's vehicle, on the mobile device in the defined data collection period. In one example where the model is trained for predicting a likelihood of accidents and thereby a higher expected frequency of claim submissions, an increased Shapley estimate value determined for a particular feature indicates a higher contribution of the particular feature in the prediction model thereby a higher risk of accidents (or higher likelihood of claim submissions) associated with that particular feature for determining the risk score. In response to receiving a plurality of vehicle behaviour data, the actions further may include: extracting the features from the vehicle behaviour data, may include: a set of frequency features pertaining to a frequency of trips taken by the vehicle within the data collection period; a set of location features pertaining to a plurality of key locations as determined from trips taken by the vehicle during the data collection period; a set of driving quality features including driving information pertaining to how the vehicle is being driven as captured from the geo-tracking system; and a set of application features derived from the usage characteristics of interacting with the risk assessment computer application for a profile associated with the policyholder's vehicle. The features further may include: the frequency features may include metadata about how often the vehicle is driven, average duration of time that the vehicle is driven, average distance travelled by the vehicle on a given trip, and time at which the trips are taken; the location features may include: a source and end destination for each of the trips within the data collection period and most visited location(s) for the vehicle; the driving quality features may include: at risk events taken in the trips and average speed occurring within the data collection period; and, the application features may include the usage characteristics for the risk assessment computer application relating to how often trip data points are deleted from a profile associated with the policyholder's vehicle during the data collection period. The actions further may include: determining the key locations in the location features extracted for the vehicle by applying hierarchical clustering where a geographical vicinity that the trip starts or ends at most frequently is considered to be a home location for the vehicle, the geographical vicinity that the trip starts or ends at a second most is considered to be a work location. The location features are derived by automatically separating a start and end point of each trip within the data collection period into the key locations and averaging a number of trips that start or end at the key locations as one of the vehicle behaviour data which is input into the prediction model. The application features for deletion are derived by adding up the number of times trip data was deleted from the risk assessment computer application during the data collection period, and a total distance traveled within deleted trips. The prediction model is trained on the historical vehicle behaviour data over the past time period to predict the frequency of the claim submissions in the future time period where the past time period is for a same duration of time as the future time period. The prediction model being initially trained to use the vehicle behaviour data may include: a duration of trips and a distance of trips taken by the vehicle over the past time period via a regression model to predict the vehicle behaviour data over the future time period that is correlated with the frequency of the claims submissions in the future time period. The risk score is assigned to the data collection period by first assigning a weight to each said feature based on the contribution that that feature has in the prediction model, where each said feature element has a unique weight, and then applying a sum to a corresponding weight for each said feature to assign the risk score. The prediction model is, in at least some embodiments, an extreme gradient boosting model where the model is trained in an additive manner using the historical vehicle behaviour data. Implementations of the described techniques may include hardware, a method or process, or computer software on a computer-accessible medium.

In yet another aspect there is provided a computer-implemented method for providing a risk assessment for a policyholder's vehicle, the method comprising: receiving a plurality of vehicle behaviour data from a mobile device associated with the vehicle aggregated over a defined data collection period, the vehicle behaviour data comprising a plurality of features relating to operating the vehicle over a defined data collection period, at least some of the features captured from a geo-tracking system on the mobile device while driving the vehicle; providing the vehicle behaviour data to a supervised learning prediction model, the prediction model being trained on historical vehicle behaviour data over a past time period, to generate a predicted value of a frequency of expected claim submissions submitted to an entity managing a policy of the policyholder's vehicle in a future time period; computing a Shapley estimate value for each feature of the vehicle behaviour data applied to the prediction model for determining a contribution of each said feature to the predicted value, wherein the Shapley estimate value for each said feature is determined by performing a spline approximation to an output of a Shapley function applied to each said feature to estimate the contribution of each said feature; and, generating an output of a sum of the Shapley estimate value for each said feature, the sum being correlated directly to a risk score for the risk assessment and instructing the mobile device to display the risk score on a risk assessment computer application storing a profile for the policyholder's vehicle.

A non-transitory computer readable medium having stored thereon computer program code that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

These and other features of the disclosure will become more apparent from the following description in which reference is made to the appended drawings wherein.

DETAILED DESCRIPTION

Generally, in at least some embodiments, the present disclosure is directed to risk assessment systems and methods for providing a dynamic driver risk assessment including a driver risk score, by the training of computerized machine learning prediction models based on driving features to predict a frequency of future expected claim submissions. The systems and methods use a sum of estimated Shapley values for the features input into the prediction model to determine a contribution of each feature as compared to other features to the overall model output. The sum of the estimated Shapley values may then be used to generate a corresponding risk score. The Shapley values may be better estimated using a spline representation such that the coefficients of the spline curve are used to calculate the sum used to determine the risk score. Generally, the features used may include driver performance captured from telematics and/or risk application usage behaviours including how often the user drives, where the user drives, how the user drives, and whether the user decides to delete or modify certain trips or driver behaviours from their driving profile on the system.

The proposed system and method provides a more accurate and efficient method of evaluating a driver's safety based on a sum of contribution averages taking into account other features rather than cumulative scoring, and better correlates to future expected claim submissions as the prediction model has been trained based on historical driving features to predict future expected claim submissions. Rather than assigning a safety score to a driver based on arbitrary reductions from a score of 100 (e.g. speeding event=−10, accidents=−10, etc.), in at least some implementations, the proposed system and method is skewed towards the risk that the driver takes by assessing each event where each event has a magnitude. In at least some aspects, the system aggregates these trip-based scores on a monthly basis in order to provide more stability to the scoring system. The monthly aggregated score, as proposed, are determined to be more effective in predicting the amount of potential claim submissions for the month immediately following that aggregated month.

Thus, in at least some aspects, the system generates for the driver of a vehicle a score for each trip that they take (e.g. based on driver performance and/or driver use of application for generating the driver score) and this score is aggregated on a monthly basis. These monthly aggregate scores correlate to the number of claims the driver is expected to make in the month immediately following the aggregate score month.

Figure 1:
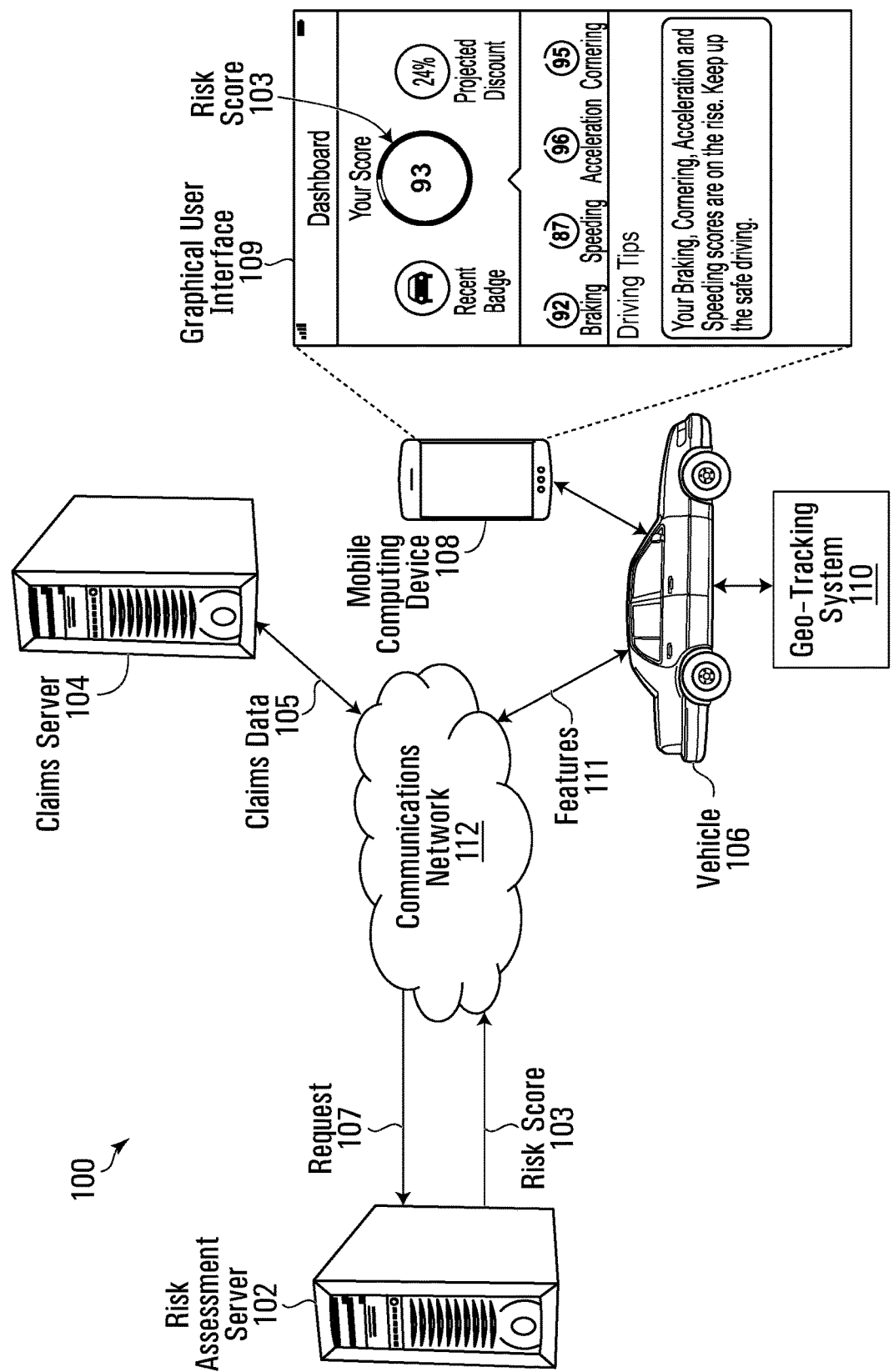
FIG. 1 is a diagram illustrating a representative computer environment including a risk assessment server communicating in a communication network with a claims server and a vehicle and configured to output a driver risk score for display on a mobile computing device for the vehicle, in accordance with one or more aspects of the present disclosure.

FIG. 1 illustrates a block diagram of an example computer system 100 for providing a risk assessment for drivers of vehicles, in which a risk assessment server 102 is configured to communicate with one or more other computing devices, including a claims server 104, one or more vehicles 106 having associated telematics and sensors including a geo-tracking system 110 (e.g. the telematics using a plug-in device, pre-installed in the car's network, and/or accessible through mobile applications accessing the car), using a communications network 112. Claims server 104 comprises at least a processor, and memory including data stores coupled thereto as well as a communication device for communicating with other devices in the system 100 (not shown). It is understood that the system 100 may include additional computing modules, processors and/or data stores in various embodiments not shown in FIG. 1 to avoid undue complexity of the description. It is understood that FIG. 1 is a simplified illustration.

Generally, in at least some aspects, the proposed risk assessment system provided by the system 100 operates by compiling a number of driver related features (e.g. driving behaviours captured via the geo-tracking system 110 and/or driver interaction with a computer application tracking and outputting a risk score 103 for a driver of the vehicle 106) collected over a defined time period. The computer application tracking the risk score 103 may be provided on the mobile computing device 108 associated with the vehicle 106. FIG. 1 illustrates a graphical user interface 109 of an example computer application tracking the risk score 103. The collected driver features 111 are input into a predictive machine learning model provided by the risk assessment server 102 in order to produce a prediction as to an expected claim frequency associated with the input features for a future time period, e.g. month following the target data month. In one example, the predictive machine learning algorithm provided by the risk assessment server 102 is an extreme gradient boosting (XGBoost) algorithm.

In a present non-limiting example, the risk assessment server 102 may receive a request 107 for a risk score 103 associated with a driver of the vehicle 106 being a policy holder for insurance with an entity also associated with the claims server 104. The claims server 104 is in turn configured to store profiles of all drivers insured by the entity (e.g. historical driving behaviours, driver features, and customer information) as well as a set of claims submitted for the entity by each of the drivers of the system 100 (e.g. driver of vehicle 106). The request 107 may thus originate from the claims server 104 and/or the mobile computing device 108 having a risk assessment application for tracking and presenting risk scores to associated users so that they may be aware of their risk score and factors associated with the generated scores.

In response to receiving the request 107, the risk assessment server 102 is configured to access the claims server 104 to retrieve claims data 105 which includes historical claims submitted over a past time period for a driver of the vehicle 106. The risk assessment server 102 may be configured to continually track historical driver features associated with a policyholder of a vehicle (e.g. vehicle 106). Thus the system 100 is constantly capturing features 111 and related metadata defining the features, via the risk assessment server 102, relating to the user of the mobile computing device 108 accessing a risk assessment application (a GUI of which is shown in the graphical user interface 109) and, more specifically, the user's driving behavior (e.g. a driver of the vehicle 106 which may be captured via the geo-tracking system 110). As will be understood, although a single mobile computing device 108 and a single vehicle 106 have been depicted in FIG. 1 for simplicity in the figures and description, multiple mobile computing devices 108 associated with a same vehicle 106 or multiple corresponding vehicles 106 may be envisaged in accordance with one or more embodiments.

Generally, different types of driver features 111 may be obtained from one or more computing devices associated with the vehicle 106 including the mobile computing device 108 and the geo-tracking system 110. The geo-tracking system 110 may be a computing device and/or telematics directed located within the on-board processing system of the vehicle 106 or alternatively an external monitoring and sensing device in communication with the vehicle 106. The geo-tracking system 110 may include but not limited to, a global positioning system (GPS) tracking unit, on-board diagnostics system, telematics devices, a geo-tracking unit, or other electronic navigational tracking systems which allows tracking and monitoring of real-time physical locations of the vehicle 106 and associated metadata such as time or duration associated with each location. The geo-tracking system 110 may additionally track trip starting points, ending points, time, duration and other trip information of various trips taken by the vehicle 106.

The features 111 may be aggregated into defined categories of features over a defined data collection period of time (e.g. a month). As will be defined, in some aspects, the data collection period of time may be similar to how far out the projection of the claim frequency will be made by the prediction model of the risk assessment server 102 in order to calculate the risk score 103 (e.g. aggregate feature data over the last month to predict claim frequency over the next month).

Figure 2:
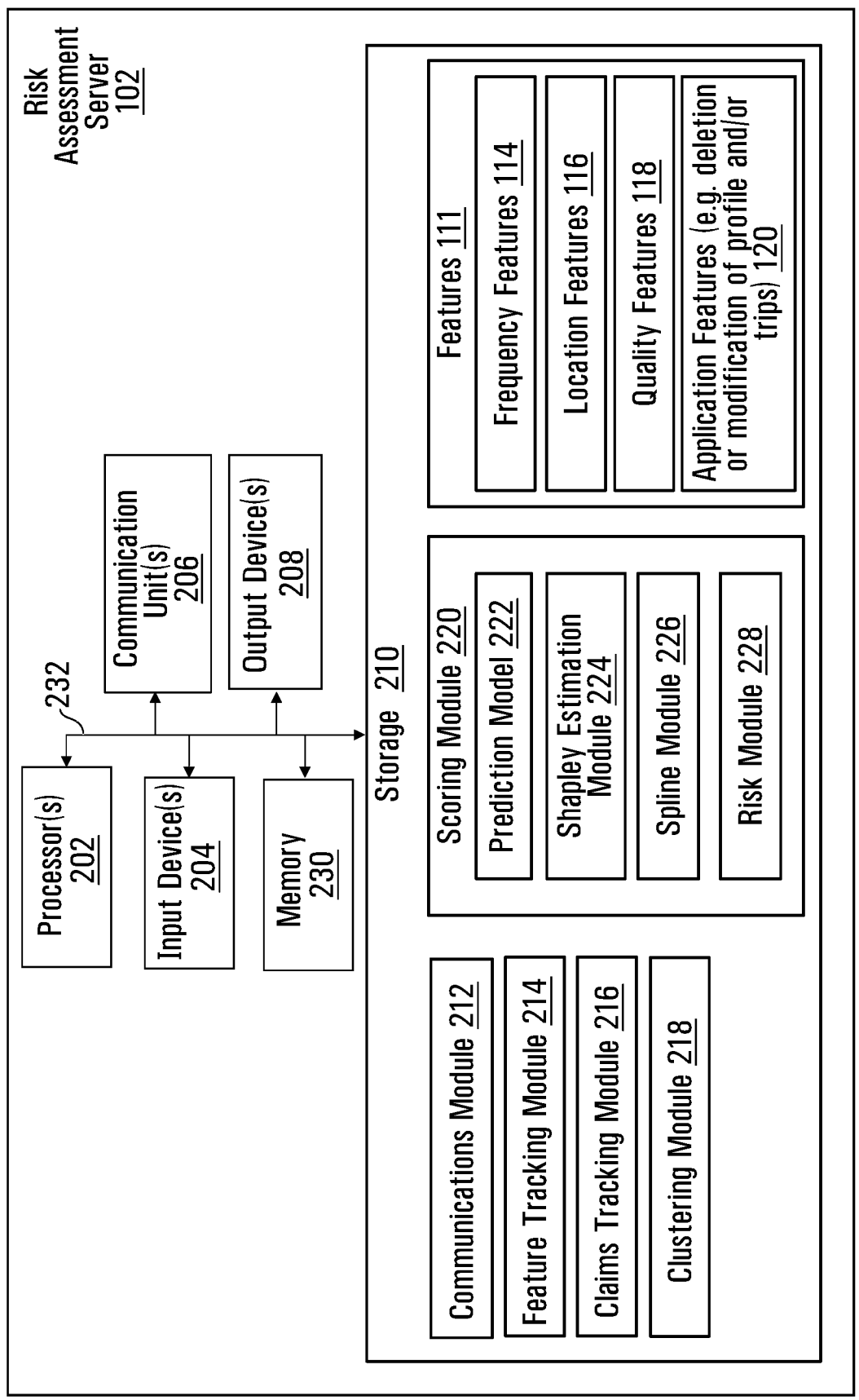
FIG. 2 is a diagram illustrating details of the risk assessment server of FIG. 1, in accordance with one or more aspects of the present disclosure.

In a non-limiting example, referring to FIGS. 1 and 2, the features 111 collected and requested from computing devices associated with the vehicle 106 and provided to the risk assessment server 102 may include but not limited to: 1) frequency features 114, 2) location features 116, 3) driver quality features 118, and 4) application features 120. For example, the frequency features 114 may relate to how often the user drives the vehicle 106. These features 111 may include the distance driven on average per each trip in the given data gathering period; the average duration of time for each trip in the given data gathering period; the aggregated distance and durations over the course of defined time period, e.g. a month in the given data gathering period or over the course of a season.

Figure 8:
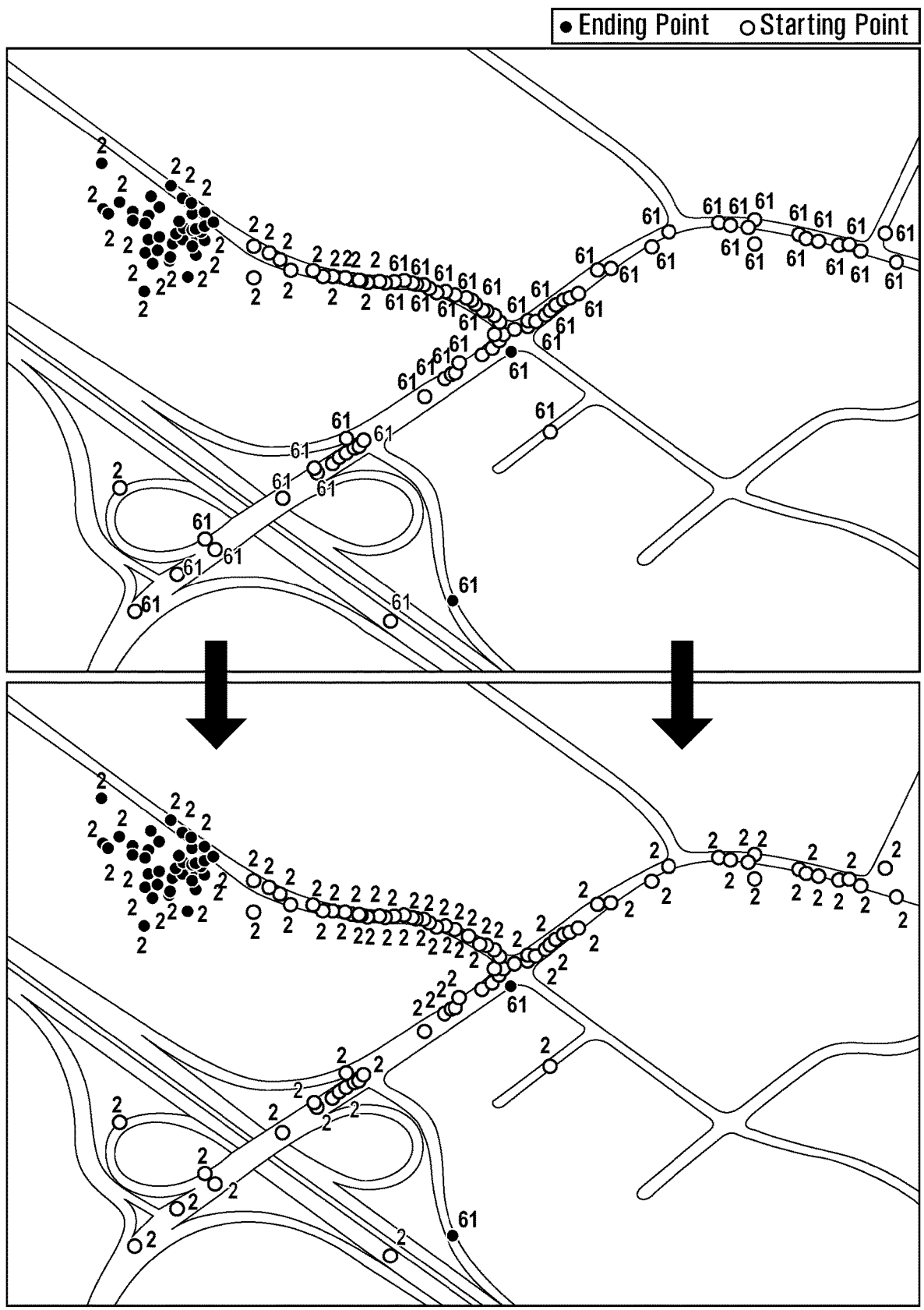
FIG. 8 is a diagram illustrating an example process for determining location features, such as starting point and ending point of a trip by applying hierarchical clustering, in accordance with one or more aspects of the present disclosure.

Location features 116 may relate to information about where the driver of the vehicle 106 drives in terms of their start and end destinations of each trip and locations most visited. These features include home location features that are the average number of trips that start or finish at home; work location features that are the average number of trips that start or finish at work; and the infrequent location features that are the average number of trips that start or finish at an unknown place. Preferably upon receiving the location features 116, in order to derive useful information therefrom, the risk assessment server 102 may be configured to perform clustering (e.g. via clustering module 218), from a large number of start and endpoints captured in the driving data, to determine patterns such as which detected vehicle locations relate to known locations (e.g. home, work, other). Additionally, clustering may be used to determine what each of the start and endpoints relate to: the driver's home, the driver's work, another location that the driver of the vehicle 106 goes to most frequently, and places that do not fit into any of these defined categories. In at least some aspects, the risk assessment server 102 may employ a hierarchical clustering method, via a clustering module 218 shown in FIG. 2 to the information derived from location features 116 received in order to fit start and endpoints into the above categories. FIG. 8 illustrates an example of applying hierarchical clustering to the locations to fix the starting point cluster in order to define the starting point. FIG. 8 illustrates example first set of nodes 61 having associated start and end points for a first trip (e.g. associated with trips occurring between a first source and a first destination) and second set of nodes 2 for a second trip (e.g. associated with trips occurring between a second source and a second destination). The clustering process performed by the clustering module 218 may involve clustering close start and end points together, and then clustering those larger clusters with other larger clusters, etc., until final clusters can be distilled. When the largest clusters available are determined, the clustering module 218 may be configured to assign a home location to the largest cluster, a work location to the second largest cluster, and the third most frequently visited location to the third cluster. In effect, one goal of the clustering process performed by the clustering module 218 is to determine most visited locations for each driver from one or more location features 116. Other clustering techniques such as k-means clustering, 3-dimension clustering, rounding the coordinates, etc. may be applied.

When hierarchical clustering is applied, the number of clusters is not specified. Rather, after the hierarchy is built, a defined linkage distance may be set. Each location point may be treated as a separate cluster and with every iteration, the closest clusters get merged. This process may thus be tracking and displaying a risk score 103 on a display of the mobile computing device 108 for a driver of the vehicle 106 as obtained from the risk assessment server 102 and associated reasoning (e.g. as shown in an example display of a graphical user interface 109 in FIG. 1). As shown in FIG. 1, such graphical user interface 109 may display average driver risk score 103, events associated with the driver score (e.g. braking, acceleration, etc.) and driving tips for improving the driver score. The user interactions captured by the application features 120 may include for example, when a user and/or driver selects to delete trip data logs from the system. These deletion features may include the number of deleted trips within a given data gathering period and a total distance traveled in the deleted trips.

Table 1 illustrates additional examples of the features 111 tracked and captured by the computing systems associated with the vehicle 106 and provided to the risk assessment server 102 for subsequent processing.

TABLE 1

Usage Based Insurance (UBI) Example Features (Aggregated Data)

| How much do you drive? | Where do you drive? | How do you drive? | | Risk Assessment Application Usage (e.g. deleted or modified trip information) |
|---|---|---|---|---|
| Distance | Home locations The average number of trips that start or finish at home | Average sum of events per km Magnitude levels 1-3 and 4-5 Acceleration (a1-a3 and a4-a5) Braking (b1-b3 and b4-b5) Cornering (c1-c3 and c4-c5) Excess Speed Above Threshold (s1-s3 and s4-s5) | Average driving score | Number of deleted trips |
| Duration | Work locations The average number of trips that start or finish at work | Average speed | Average number of distracted driving events | Total distance traveled in the deleted trips |
| Month | Infrequent locations The average number of trips that start or finish at an unknown place | | Average battery consumption | |
| Season | | | | | repeated by the clustering module 218 until one single cluster remains. The linkage determines the distance between set of points as a function of the pairwise distances between points. The process for clustering starting points is repeated for end points. After clustering the end points, one of the steps performed by the clustering module 218 is to find the closest ending point cluster for each starting point and if the distance between the starting point and its cluster is greater than a defined distance (e.g. 1 km), a new cluster is created with the starting point co-ordinates.

Quality features 118 may relate to information about a characterization or safety information of the driver's driving on each trip (e.g. driver associated with the vehicle 106). These quality features 118 include an average sum of events per km, where the events are scaled on magnitude levels, e.g. 1-3 and 4-5, and events may be acceleration, braking, cornering, and excess speed above threshold (speeding); the average speed of the vehicle 106 when driven by a particular driver during each trip; the average number of distracted driving events, measured by factors such as how often the driver looks at their phone during a trip; and the average battery consumption per trip (e.g. battery consumption of the mobile computing device 108).

Figure 4:
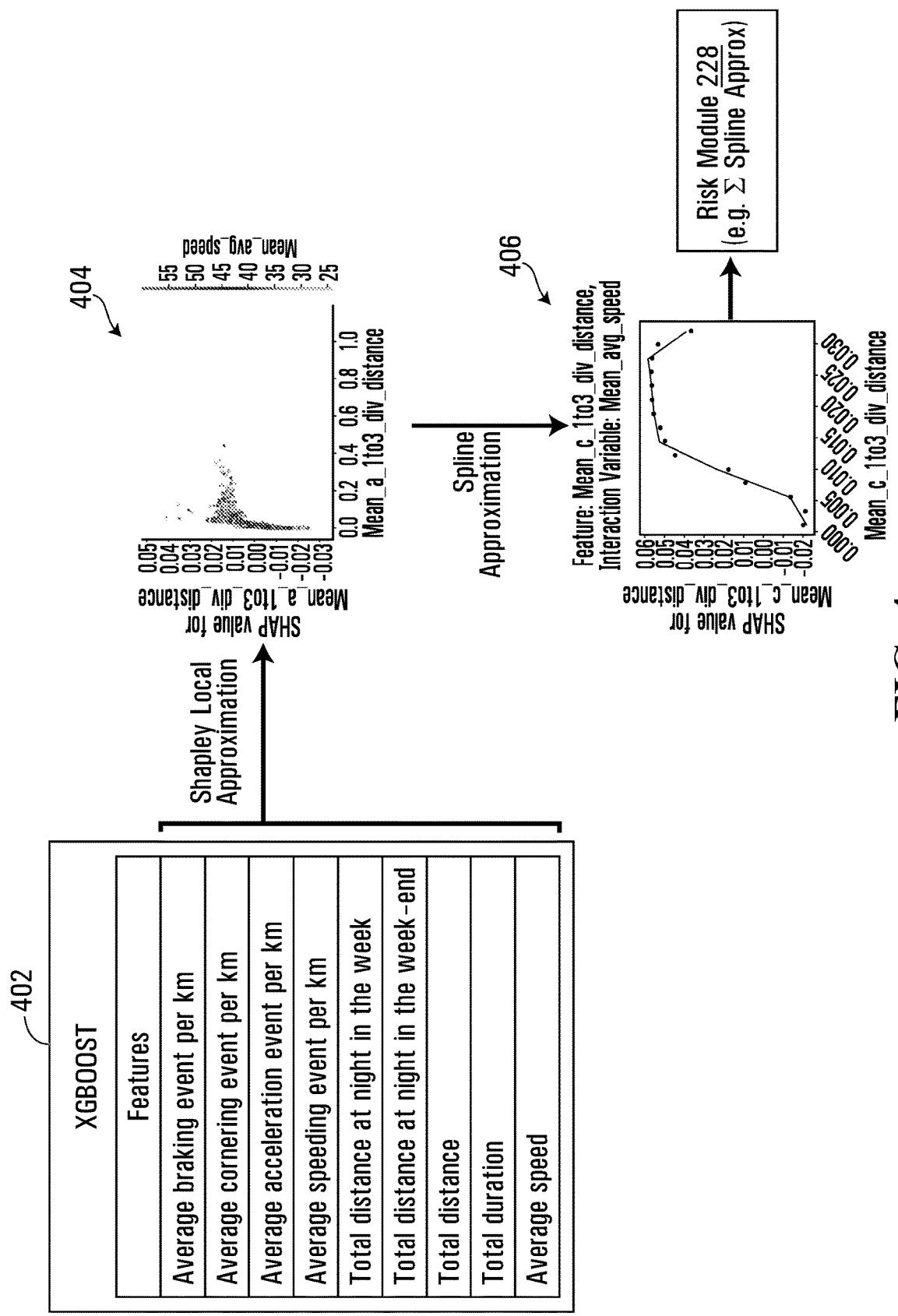
FIG. 4 is a diagram illustrating an example method performed by the risk assessment server of FIGS. 1 and 2, including input feature to a prediction model and output graphs of the Shapley local approximation and the spline approximation, in accordance with one or more aspects of the present disclosure.

Application features 120 captured relate to information about a user's interaction(s) with a software application for Referring again to FIGS. 1 and 2, once all of the current and historical features 111 are captured by the risk assessment server 102, the risk assessment server 102 is configured to apply the features 111 to a predictive machine learning model (e.g. prediction model 222) which determines a weight or contribution that each feature element has as compared to other features. The predictive machine learning prediction model 222 is preferably trained based on historical features 111 and associated claims data 105 to predict a likelihood of accidents and/or frequency of claim submission by a policyholder to the claim server 104. The contribution of each feature to the prediction model 222 in the risk assessment server 102 thus may be determined by the risk assessment server 102 by applying a Shapley estimation process, which determines the influence of each feature to the overall model in combination with a spline approximation to estimate each of the contribution coefficient using a spline representation (e.g. see also FIG. 4). As also shown in FIG. 4, the risk assessment server 102 may then be configured to perform a sum, across all features 111 of the spline coefficients which represent a contribution of each feature to the model. The sum of the coefficients may then be mapped to a risk score 103 based on a relationship table which may be stored on a storage of the risk assessment server 102. The risk score 103 is then provided to one or more computing devices associated with the vehicle 106, such as the mobile computing device 108 to display thereon (e.g. as shown in the graphical user interface 109 of FIG. 1) the risk score 103 and the associated reasoning as may be provided in metadata associated with the risk score 103 from the risk assessment server 102.

Figure 6A:
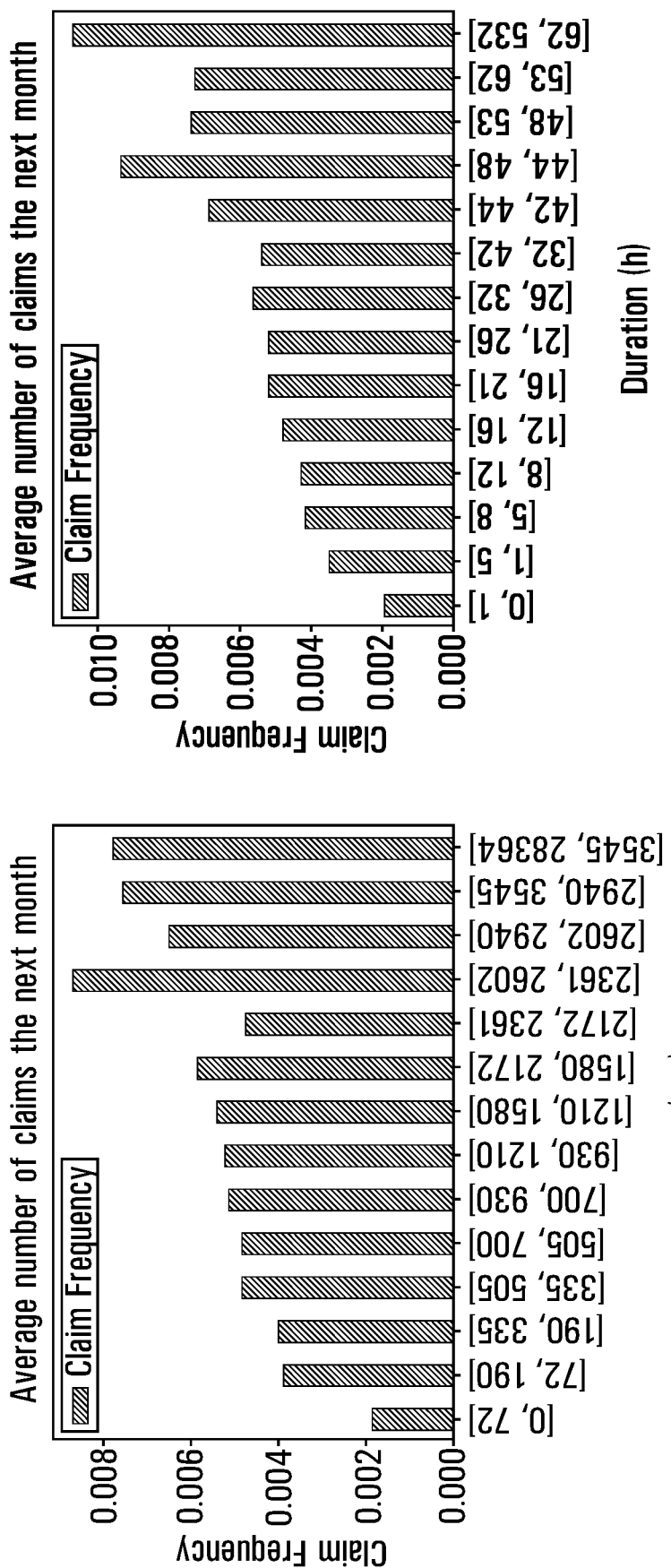
FIG. 6A is a diagram illustrating an example relationship between average number of claims in a future time period (e.g. next month) and driver features such as distance and duration of driving input into the prediction model of the risk assessment server of FIGS. 1 and 2, in accordance with one or more aspects of the present disclosure.
Figure 6B:
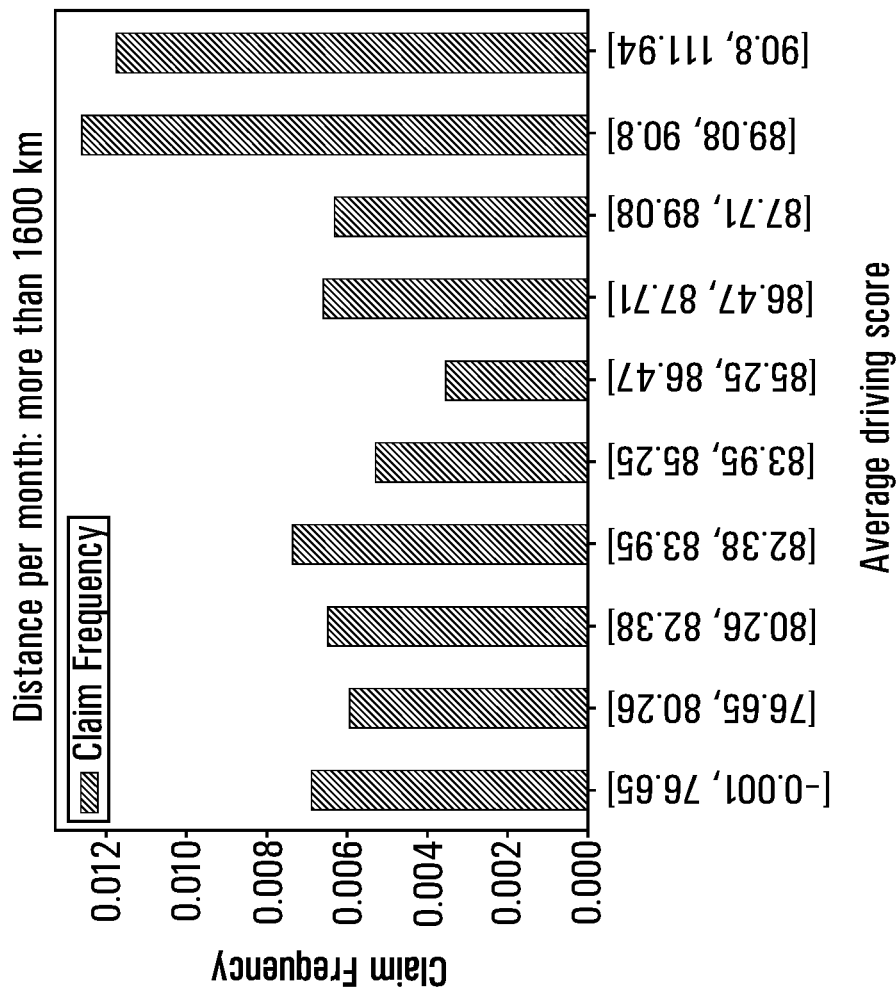
FIG. 6B illustrates an example relationship between claim frequency and average driving risk score of a policyholder driving a vehicle as illustrated in FIG. 1, in accordance with one or more aspects of the present disclosure.

The example of FIG. 6B illustrates a relationship between an average driving risk score (e.g. risk score 103) and a claim frequency when a particular condition occurs, e.g. a distance traversed by the vehicle 106 exceeds a given amount.

In the example of FIG. 1, the risk assessment server 102 and the claims server 104 are computer servers. Each of these is an example of a computing device having at least one processing device (e.g. one or more processors) and memory (e.g. a storage device, etc.) storing instructions which when executed by the processing device configure each computing device to perform operations, such as those disclosed herein.

In the example of FIG. 1, computing device for receiving a risk score 103 and displaying on a display thereon the risk score 103 is a mobile computing device 108. The mobile computing device 108 contains either a native or browser-based risk assessment computer application for displaying on a graphical user interface 109 of the device a profile for a driver of the vehicle 106, the received risk score 103 and associated analytics including reasoning for deriving the risk score 103 by the risk assessment server 102. The mobile computing device 108 may further be configured to communicate with an on-board computing system on the vehicle 106, such as to review, monitor and respond to readings and communications from the vehicle's connected electronic and sensor components (e.g. controller area network). The mobile computing device 108 may further be configured to receive on the graphical user interface 109, user input such as modification of stored logs of trips, including deletion of trips or portions of trips; or modification of user profiles (e.g. updating account information, start and end points of trips, trip information, etc.) which will result in the risk assessment server 102 dynamically updating the risk score 103 and generating an updated risk score 103 for display on the graphical user interface 109. Other examples of mobile computing device 108 may be a tablet computer, a person digital assistant (PDA), a laptop computer, a tabletop computer, a portable media player, an e-book reader, a watch, or another type of computing device. In some aspects, the mobile computing device 108 may be integrated with and part of the on-board computing system present in the vehicle 106.

Risk assessment server 102, the claims server 104, the vehicle 106 (including on-board and external computing systems), the mobile computing device 108, the geo-tracking system 110 are coupled for communication to one another via the communications network 112, which may be a wide area network (WAN) such as the Internet. Additional networks may also be coupled to the WAN of communications network 112 such as a wireless network and/or a local area network (LAN) between the WAN and computing devices shown in FIG. 1.

FIG. 2 shows example computer components of risk assessment server 102, in accordance with one or more aspects of the present disclosure, for example, to provide a system and perform a method to train a prediction model for receiving features 111 for the driver(s) of the vehicle 106, including driver behaviours and generate an executable, which is operable to determine an expected frequency of claims submissions for the driver and thereby an expected risk score 103 derived from the contribution of the features 111 to the prediction model. The risk score 103 being a sum of the estimated contribution of each feature relative to other feature and correlated to the expected claim frequency. The risk assessment server 102 being configured to communicated with an external computing device, e.g. the mobile computing device 108 having a risk assessment computer application and graphical user interface 109, implementing a request 107 for the risk score 103 to instruct displaying the risk score 103 thereon.

The risk assessment server 102 comprises one or more processors 202, one or more input devices 204, one or more communication units 206, one or more output devices 208 and a memory 230. Risk assessment server 102 also includes one or more storage devices 210 storing one or more computer modules such as a communications module 212, a feature tracking module 214, a claims tracking module 216, a clustering module 218, a scoring module 220 comprising a prediction model 222, a Shapley estimation module 224, a spline module 226, a risk module 228, and a set of driver features 111 capturing driver performance behaviour and/or application usage comprising: frequency features 114, location features 116, quality features 118, and application usage features 120. Examples of the features 111 are also shown in Table 1.

Communication channels 232 may couple each of the components including processor(s) 202, input device(s) 204, communication unit(s) 206, output device(s) 208, memory 230, storage device(s) 210, and the modules stored therein for inter-component communications, whether communicatively, physically and/or operatively. In some examples, communication channels 232 may include a system bus, a network connection, an inter-process communication data structure, or any other method for communicating data.

One or more processors 202 may implement functionality and/or execute instructions within the risk assessment server 102. For example, processors 202 may be configured to receive instructions and/or data from storage devices 210 to execute the functionality of the modules shown in FIG. 2, among others (e.g. operating system, applications, etc.). Risk assessment server 102 may store data/information (e.g. model features 111 generated from the claims server 104, the vehicle 106, the geo-tracking system 110, the mobile computing device 108 and/or locally generated) to storage devices 210. Some of the functionality is described further herein below.

One or more communication units 206 may communicate with external computing devices (e.g. computing devices shown in FIG. 1) via one or more networks (e.g. communications network 112) by transmitting and/or receiving network signals on the one or more networks. The communication units 206 may include various antennae and/or network interface cards, etc. for wireless and/or wired communications.

Input devices 204 and output devices 208 may include any of one or more buttons, switches, pointing devices, cameras, a keyboard, a microphone, one or more sensors (e.g. biometric, etc.) a speaker, a bell, one or more lights, etc. One or more of same may be coupled via a universal serial bus (USB) or other communication channel (e.g. communication channels 232).

The one or more storage devices 210 may store instructions and/or data for processing during operation of the risk assessment server 102. The one or more storage devices 210 may take different forms and/or configurations, for example, as short-term memory or long-term memory. Storage devices 210 may be configured for short-term storage of information as volatile memory, which does not retain stored contents when power is removed. Volatile memory examples include random access memory (RAM), dynamic random access memory (DRAM), static random access memory (SRAM), etc. Storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

The risk assessment server 102 may include additional computing modules or data stores in various embodiments. Additional modules, data stores and devices that may be included in various embodiments may be not be shown in FIG. 2 to avoid undue complexity of the description.

Communications module 212 may be configured to communicate various data between the risk assessment server 102, its internal modules shown in the storage 210 and other computing devices shown in FIG. 1. Examples of data communicated via the communication module 212 may include but not limited to, for example, requests 107, risk score 103 and associated metadata (e.g. reasoning for the risk score as calculated by the server 102), features 111, claims data 105, other driver behaviour and performance data, telematics data from the vehicle 106, geographical navigation data from the geo-tracking system 110, feedback received from the mobile computing device 108 via the graphical user interface 109, model parameters for training the prediction model 222, and trained model parameters for the prediction model 222, etc.

The feature tracking module 214 may be configured to track the system 100 and collect the features 111 as they become available (e.g. track for any new features and/or modifications to existing features). For example, as the system 100 operates dynamically and in real-time, the feature tracking module 214 may track whether any new trips have been taken by the vehicle 106 and extract relevant features 111. The features 111 may further then be processed as described herein to retrieve and classify them into relevant categories of information such as the frequency features 114, location features 116, quality features 118, and application features 120 as well as other feature categories and subcategories not illustrated in FIG. 2. Examples of the features 111 are further described in relation to Table 1.

Figure 7:
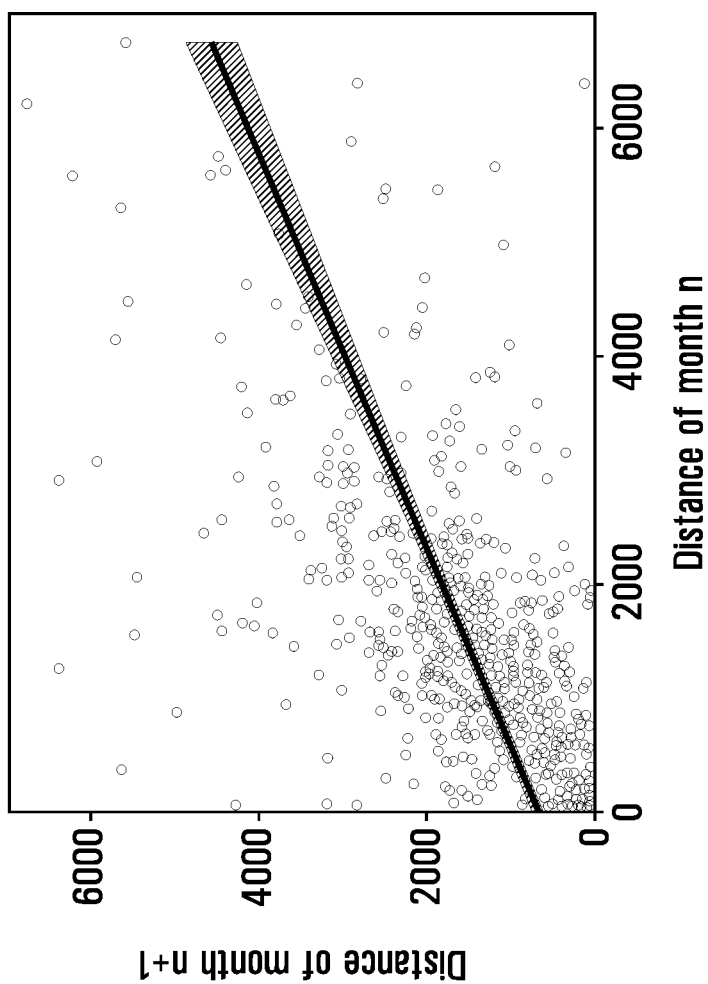
FIG. 7 is a graph illustrating an example of determining future values for a feature (e.g. distance travelled by a driver in the next month) input into the risk assessment server of FIGS. 1 and 2, applying current values for the feature using linear regression, in accordance with one or more aspects of the present disclosure.

In at least some aspects, the feature tracking module 214 shown in FIG. 2 may further be configured to pre-process the features 111 received via the system 100 and first project one or more of the received features 111 into a future time period. An example of this process is shown in the graph of FIG. 7 whereby the distance of the current month (forming part of location features 116) is projected to a future month to determine an expect future distance to be travelled by the policyholder for the vehicle 106 by applying a linear regression model to the current month's data. The linear regression model may further be tuned by examining a sample of a large set of user-based insurance (UBI) drivers for which a risk score 103 is calculated by the system 100. In at least some embodiments, the expected future distance may be provided as part of the location features 116 to the prediction model 222 in order to determine the risk score 103. In some aspects, the risk score 103 may be referred to as a user-based insurance score.

Figure 9:
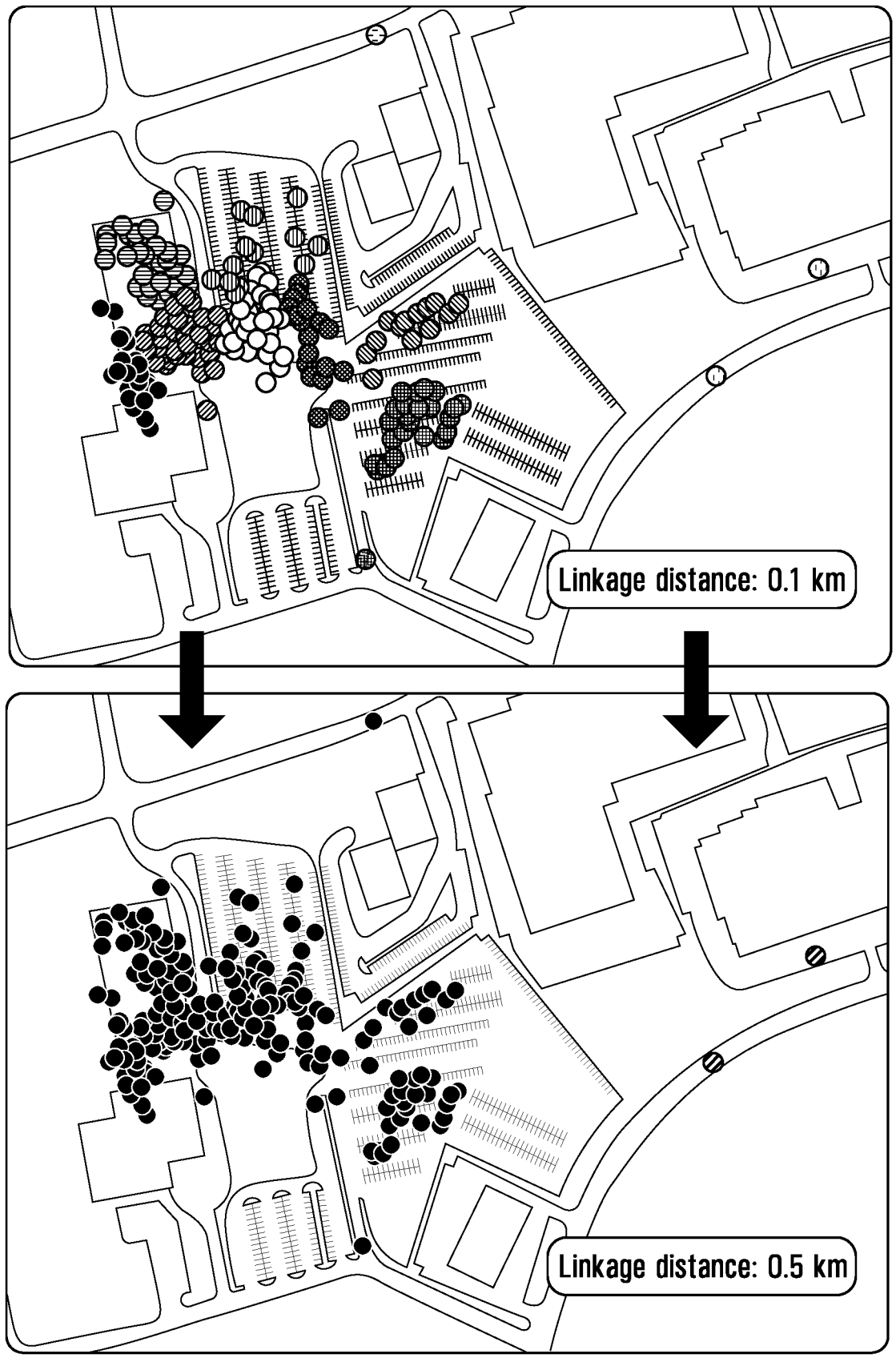
FIG. 9 is a diagram illustrating an example process for determining location features, by adjusting a linkage distance between starting points or end points using hierarchical clustering, in accordance with one or more aspects of the present disclosure.

Referring again to FIG. 2, the clustering module 218 may be specifically tailored to extract relevant location features 116 from the features 111 such as to determine starting points and ending points of each trip provided in the features 111. Additionally, the clustering module 218 may be applied via the feature tracking module 214 to the dataset received from the vehicle 106, geo-tracking system 110, and/or mobile computing device 108 which may contain raw trip information for each trip performed by the vehicle 106. The clustering module 218 may be configured to apply a hierarchical clustering such that each point is treated as a separate cluster and with every iteration, the closest clusters get merged. This process repeats until one single cluster remains. The linkage determines the distance between sets of points as a function of the pairwise distances between points. The effect of modifying the linkage distance is shown in FIG. 9 with the left hand figure showing a lower linkage distance and the right hand figure showing a higher linkage distance such that all of the nodes in the right hand graph may be grouped together in one cluster. As noted above, the clustering module 218 may be configured such that different sized clusters may be ranked and assigned to different common locations. For example, a biggest sized cluster may be associated with a home address. The second biggest cluster may be associated with a work address, and a third most frequently visited location may be assigned to the third biggest cluster. FIG. 8 further illustrates applying the clustering module 218 to determine an ending point and a starting point of trips based on hierarchical clustering. The clustering module 218 thus categorizing the features 111 into desired categories of the location features 116.

The claims tracking module 216 may be configured to receive claims data 105 from the claims server 104 and to process such data such as for use in training the prediction model 222. Notably, the current claim frequency information retrieved from the claims data 105 may be used to train the prediction model 222 along with the features 111 to predict the claim frequency of a future time period. As shown in FIG. 6A there is a relationship between the retrieved trip information, which may be provided as part of the features 111, and a future expected claim frequency over a future time period, e.g. a month. As illustrated in FIG. 6A, the distance and duration travelled as provided in the location features 116 of a current month are correlated with a claim frequency of the next month.

Referring again to FIG. 2, the scoring module 220 is configured to receive the driver performance and/or application usage data provided by the features 111 and provide them to the prediction model 222 in order to predict a frequency of expected claims to be submitted in a future time period, e.g. next month based on feature data collected over a prior time period. As mentioned above, in at least some embodiments, the features 111 may have been captured and pre-processed by the feature tracking module 214 to project them first to a future time period, an example of such projection using linear regression shown in FIG. 7.

The prediction model 222 is a machine learning model and preferably, in at least some embodiments, an extreme gradient boosting model, such as XGBoost, which utilizes the features 111 to predict a future likelihood of claim submissions for a policyholder of the vehicle 106 for which the features are processed.

Generally, regular gradient boosting uses a loss function of a base model (e.g. decision tree) as a proxy for minimizing an error of the overall model, XGBoost uses the 2nd order derivative as an approximation. Extreme Gradient Boosting is an efficient open-source implementation of the stochastic gradient boosting ensemble algorithm. XGBoost is an implementation of gradient boosted decision trees designed for speed and performance. Advantageously, utilizing an extreme gradient boosting model that can be used for classification or regression predictive modeling problems, as a way to predict expected claim frequency submission based on the features 111 allows an accurate and time efficient prediction, according to at least some embodiments of the present disclosure. In the extreme gradient boosting model, trees are added one at a time to the ensemble and fit to correct the prediction errors made by prior models, and configured by the prediction model 222 to accurately utilize historical driver behaviour data over a past time period, e.g. a month, to predict future driver behaviour and thereby expected claim submission frequency rate over a similar future time period, e.g. the next month.

The prediction model 222 may thus be trained by historical feature data and historical claims data captured from a number of policyholders (e.g. claims data 105, and features 111 captured from the system 100 for the current policyholder and other policyholders of the entity) to predict a likelihood that a particular driver's behaviours may lead to one or more accidents in the near future and thus an expected claim frequency over the future time duration. Once the prediction model 222 is trained during a training phase and used in the testing phase on actual current features 111 of a particular driver to predict a likelihood of accidents occurring and claim submissions in the near future, the trained model and its parameters may be provided to a Shapley estimation module 224. As may be envisaged, the prediction model 222, its inputs, outputs, trained model parameters, etc. may be accessed by the remaining modules of the scoring module 220 to calculate the risk score 103 in FIG. 1.

Notably, the prediction model 222 feeds into the Shapley estimation module 224. The Shapley estimation module 224 is configured to assign a corresponding Shapley value to each data point input into the prediction model 222. Namely, each of the features 111 input into the prediction model 222 to generate an expected claim submission frequency is assigned a Shapley value. The Shapley values assess every combination of predictors (e.g. features 111 and/or claims data 105) to determine each predictor's impact on the output. Typically, as noted earlier, each category of the features 111 are aggregated over a duration of time.

Figure 5:
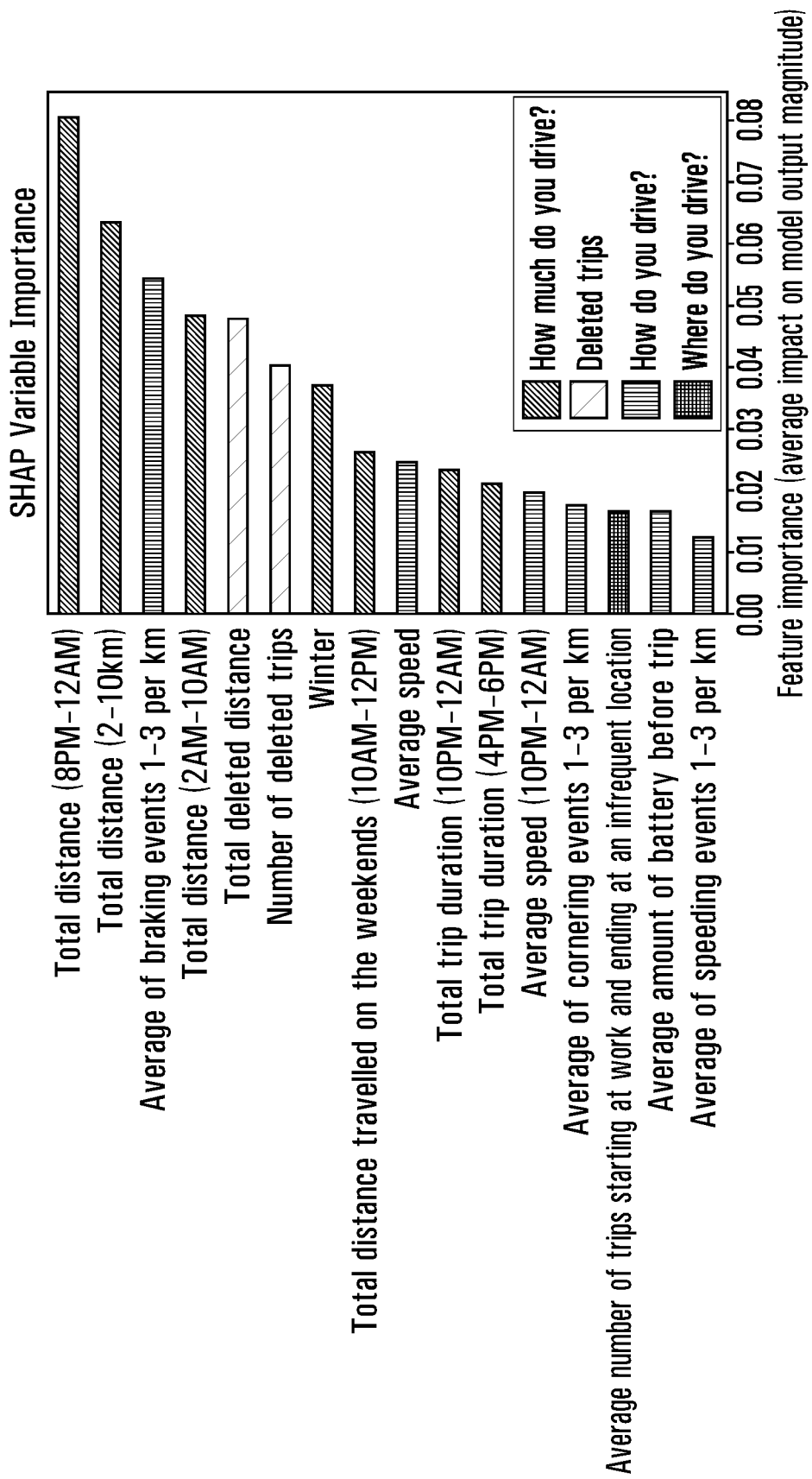
FIG. 5 is a diagram illustrating an example graph of determining feature importance for a number of features applied to the prediction model of the risk assessment server of FIGS. 1 and 2, in accordance with one or more aspects of the present disclosure.

FIG. 5 illustrates an example bar graph of determining the Shapley variable importance values for a number of example features which may be processed by the prediction model 222 of FIG. 2 for predicting future claims, e.g. average number of speeding events which may be captured by the quality features 118, total distance travelled which may be captured by the location features 116, number of deleted trips and total deleted distance which may be captured by the application features 120, etc. The higher the Shapley value for a given feature 111 for a policyholder of the vehicle 106, the more likely to result in an accident.

Referring to FIGS. 2, 4 and 5, an example of the Shapley local approximation provided by the Shapley estimation module 224 is provided in the graph illustrated at step 404 of FIG. 4.

Referring to the example process of FIG. 4, a set of features are fed at step 402 to a prediction model 222 such as an XGBoost model to predict future claim submissions. Based on the generated model, a Shapley local approximation is generated at step 404 for each and every one of the feature via the Shapley estimation module 224. The graph at step 404 is an example Shapley curve for a distance feature.

Referring to FIGS. 2 and 4, a spline module 226 is configured to receive the Shapley data points (e.g. which may be a scattered set of values as shown in the graph at step 404) provided by the Shapley estimation module 224 and generate a representative spline curve. The spline is defined piecewise by polynomials and aims to represent the scattered data points output by the Shapley estimation module 224 as a spline function having associated coefficients. An example of such a spline curve to estimate a representation of the Shapley values for a given feature (e.g. distance) is shown at 406 in FIG. 4.

Figures 4A, 4B:
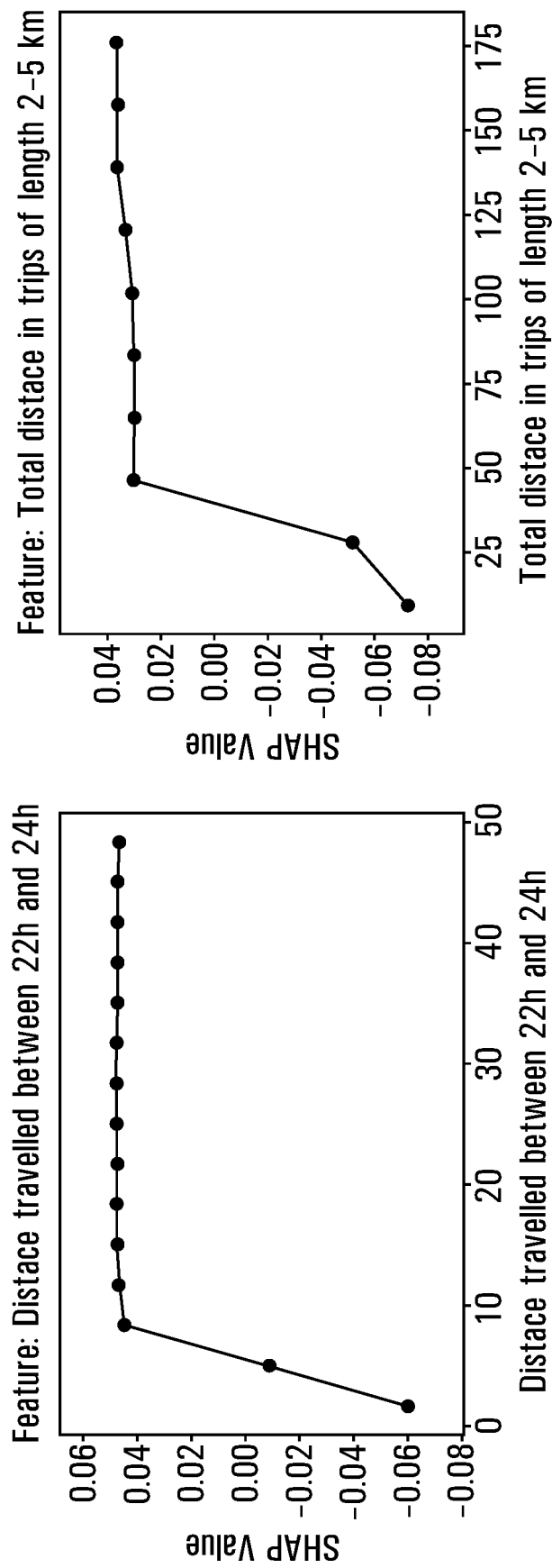
FIGS. 4A-4C are example graphs illustrating the Shapley values generated by the risk assessment server of FIGS. 1 and 2 for various types of features input in a prediction model for predicting a degree of risk for the particular feature.
Figure 4C:
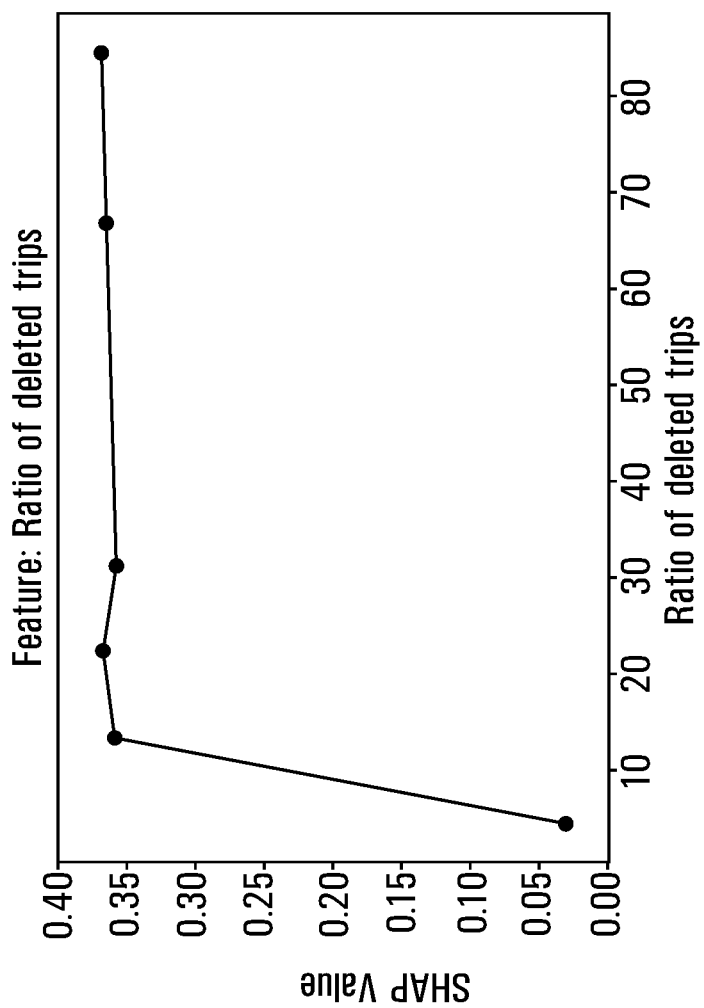

Other examples of determining the spline values for the Shapley estimation of other types of features 111 are shown in FIGS. 4A-4C via the prediction model 222, the Shapley estimation module 224 and the spline module 226. In the example of FIG. 4A, the relationship between the particular feature of distance travelled between certain hours and the Shapley value contribution is shown using a spline estimation. In the example of FIG. 4B, the relationship for another feature of total distance in trips of length 2-5 km and the Shapley value contribution is shown. In the example of FIG. 4A, the Shapley value estimation provided by the spline indicates that there an increased risk of accident, and therefore an increased risk of claim submissions for drivers travelling after 10 pm. In the example of FIG. 4B, it is indicated that there is a risk increase of accidents for drivers with a high total distance travelled consisting of short trips in a given month.

In the example of FIG. 4C, it is indicated from the spline representation of the Shapley approximation that for a particular feature of ratio of deleted trips which may be captured in the application features 120 (e.g. trips deleted from a user's profile via a risk assessment application provided by the mobile computing device 108), drivers with a high percentage of deleted trips from the log of the user (e.g. to remove associated features 111) display a higher risk of accidents.

Referring again now to FIGS. 2 and 4, once the spline module 226 generates a spline representation of the Shapley values, the output spline and associated metadata is fed into the risk module 228. The risk module 228 is then configured to perform a sum of the spline value coefficients within each feature and then add the sum for each features to the sum calculated for all of the other features. As mentioned earlier, the higher the sum of the Shapley values for all features, the higher the likelihood of risk. There is thus a direct correlation between the sum of the spline values of the Shapley estimation and an expected risk. The risk module 228 may further be configured, in at least some embodiments to map the sum of the spline values to a risk score. In some cases, the sum of the spline values directly represents the risk score. In other cases, the sum of the spline values may be mapped, via a stored relationship mapping between sum of Shapley values and the expected risk, to result in a unique risk score output by the risk module 228.

Accordingly, in at least some embodiments, the scoring module 220 is configured to analyze the prediction model 222 by assigning a weight to each feature processed by the model (derived from the Shapley value for the feature) based on a determined influence that the feature element has on the output prediction performed by the model.

It is understood that operations may not fall exactly within the modules and/or models 212, 214, 216, 218, 220, 222, 224, 226, and 228 of FIG. 2 such that one module and/or model may assist with the functionality of another.

In one example, a function may be assigned by the scoring module 220 to model the contribution determined for each feature data, e.g. each cornering event (an element of the quality features) and that function may be represented by a linear property (e.g. a spline). In this example, the function provides a graph representation of a weight to be provided to the feature, e.g. cornering event. In the current example, if a driver of the vehicle 106 has between 0.05 and 0.1 cornering events per KM, then the contribution function may assign a 0.01 (below average risk) weight. In the current example, a weight is assigned to each feature, and each feature set has its respective most important variable based on the Shapley process that is given the most weight. These examples are not meant to be limiting.

Figure 3:
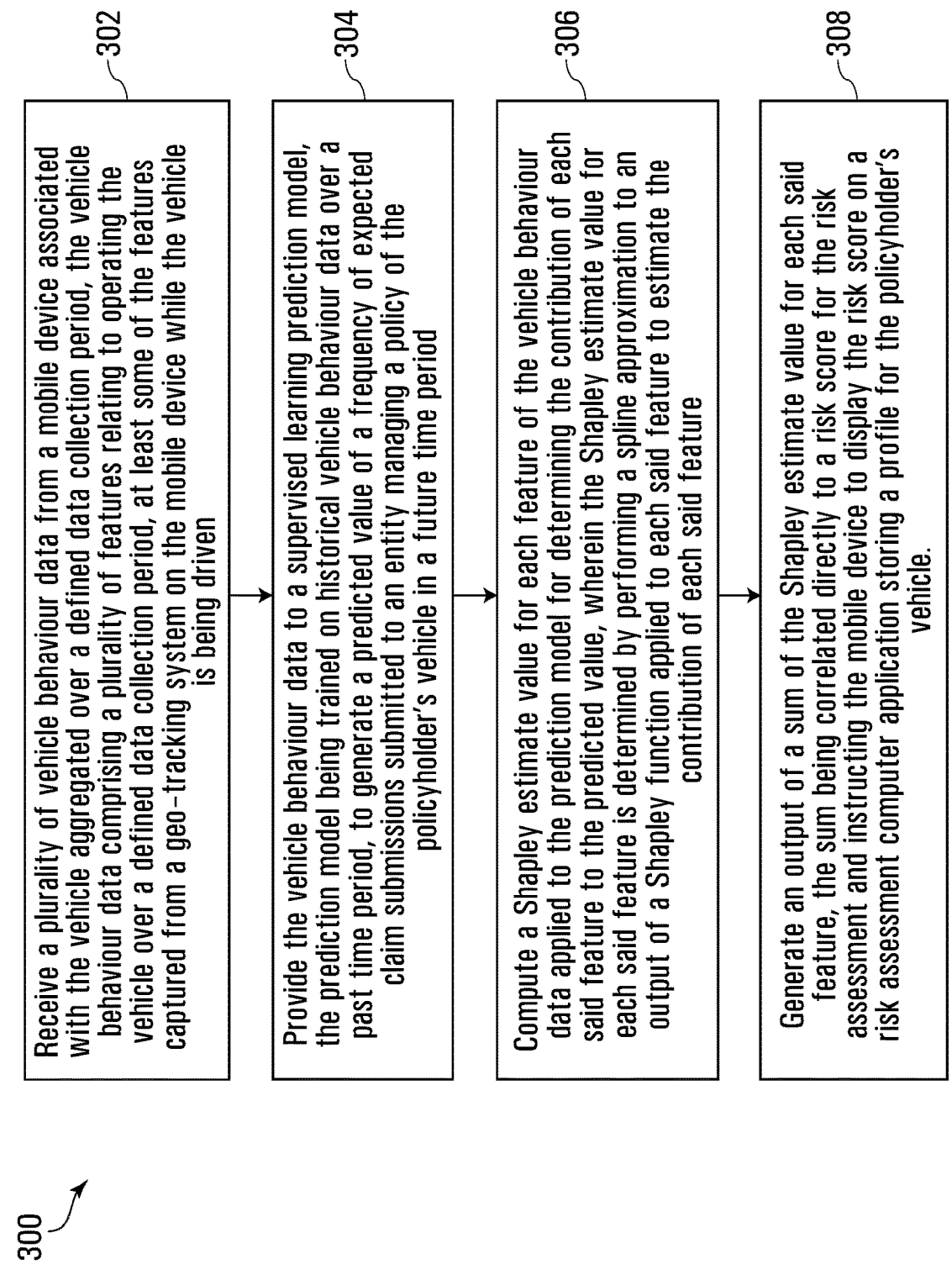
FIG. 3 is a diagram illustrating an example flow of operations for the risk assessment server of FIG. 1, in accordance with one or more aspects of the present disclosure.

FIG. 3 is a flowchart of exemplary operations 300 of the risk assessment server 102 of FIGS. 1, 2 and 4, for providing a risk assessment for a policyholder of a vehicle, the server communicating with a computing system such as a mobile device associated with the vehicle, in accordance with the disclosed embodiments. In some examples, a network-connected computer system, such as the risk assessment server 102 which is part of a system 100, may perform one or more of the exemplary steps of operations 300, which include, among other things, communicating with external claims server 104, the vehicle 106 and communicatively connected computing devices such as the mobile computing device 108, and the geo-tracking system 110 to perform the risk assessment for the driver of the vehicle 106 for display and subsequent interaction on a graphical user interface (GUI) (e.g. graphical user interface 109) associated with one of the computing devices associated with the vehicle 106.

In some aspects, operations 300 receive historical and current features 111, as well as claims data 105 for a particular policyholder and if needed, other relevant policyholders to train and test a machine learning prediction model for predicting a future likelihood of claim submissions for the particular policyholder.

The computing device for implementing the operations 300, such as the risk assessment server 102 comprises a processor configured to communicate with a display to instruct providing a GUI wherein the assessment server 102 has a communication interface to receive input features and claims related data for policyholders and wherein instructions (stored in a non-transient storage device), which when executed by the processor, configure the risk assessment server 102 to perform operations such as the operations 300.

At 302, operations of the risk assessment server 102 receive a plurality of vehicle behaviour data (e.g. features 111) from a mobile computing device 108 (and in some cases geo-tracking system 110) associated with the vehicle 106 aggregated over a defined data collection period. In some example, the data collection period may be a month and the risk assessment server 102 is configured to determine a risk assessment for the following month. At 302, the vehicle behaviour data comprises a plurality of features 111 relating to operating the vehicle 106 over a defined data collection period. Example vehicle behaviour data which are provided in the features 111, include frequency features 114, location features 116, quality features 118, and application features 120 (e.g. modification or deletion of profile or trips for the vehicle 106 on a stored log of the system 100). At 302, operations of the risk assessment server 102 provide that at least some of the features (e.g. some of the frequency features 114, location features 116 and quality features 118) are captured from a geo-tracking system 110 (e.g. GPS systems, on-board diagnostic systems, other telematics systems, etc.) are associated with one or more mobile computing device(s) 108 while driving the vehicle 106.

At 304, operations of the risk assessment server 102 provide the vehicle behaviour data (e.g. frequency features 114, location features 116, quality features 118, etc.) to a supervised learning prediction model (e.g. the prediction model 222 in FIG. 2), the prediction model 222 being trained on historical vehicle behaviour data over a past time period, to generate a predicted value of frequency of expected claims submitted to an entity (e.g. claims server 104) managing a policy of the policyholder's vehicle 106 in a future time period.

At 306, operations of the risk assessment server 102 compute a Shapley estimate value for each feature 111 of the vehicle behaviour data applied to the prediction model 222 for determining a contribution of each said feature 111 to the predicted value, wherein the Shapley estimate value for each said feature is determined by performing a spline approximation to an output of a Shapley function applied to each said feature 111 to estimate the contribution of each said feature 111. As shown in FIG. 2, the Shapley estimate may be provided by a Shapley estimation module 224 and the spline representation of the Shapley estimate may be provided via the spline module 226. FIG. 4 illustrates example outputs of a Shapley local approximation generated at step 404 and a spline approximation generated at 406.

Referring again to FIG. 3, at 308, operations of the risk assessment server 102 include generating an output of a sum of the Shapley estimate value for each said feature, the sum being correlated directly to a risk score (e.g. risk score 103 in FIG. 1) for the risk assessment and instructing the mobile computing device 108 to display the risk score on a risk assessment computer application associated with the device (e.g. graphical user interface 109) storing a profile for the policyholder's vehicle.

Thus in at least some aspects, a risk score 103 is conveniently attributed to a driver which is based on actual real-time driving behaviours and application usage parameters and correlates to the amount of risk taken by the driver of the vehicle 106 while driving.

In at least some aspect, the risk assessment computer application (e.g. native or browser based) on the mobile computing device 108 may be configured to perform at least some of the operations of the risk assessment server 102 described herein to collect and analyze the behaviour data provided in the features 111 and display a risk score 103 thereon.

Further conveniently, in at least some aspects, the proposed methods and systems provides a direct correlation between the risk score 103, e.g. UBI score provided and claim frequency. Additionally, in at least some aspects, since the system 100 tracks application features 120, which tracks interactions with the risk assessment application such as deletion of driver behaviours or trips; turning off location or de-activation of the application, then such behaviours are also accounted for in the risk score determination provided by the risk assessment server 102 such as to continue to provide dynamic and accurate risk assessments.

One or more currently preferred embodiments have been described by way of example. It will be apparent to persons skilled in the art that a number of variations and modifications can be made without departing from the scope of the disclosure as defined in the claims.

What is claimed is:

1. A server for machine learning, the server communicating with a mobile device on a policyholder's vehicle and comprising:

a computer processor; and a non-transitory computer-readable storage medium storing instructions that when executed by the computer processor perform actions comprising:

receiving a plurality of vehicle behaviour data from the mobile device associated with the vehicle aggregated over a defined data collection period, the vehicle behaviour data comprising a plurality of features relating to operating the vehicle over a defined data collection period, at least some of the features captured from at least one sensor of a geo-tracking system on the mobile device for continually capturing sensor data relating to the vehicle while the vehicle is being driven, and usage characteristics of a risk assessment computer application, associated with the policyholder's vehicle, on the mobile device in the defined data collection period, the usage characteristics for the risk assessment computer application comprising how often trip data points are deleted from a profile associated with the policyholder's vehicle during the data collection period;

applying hierarchical clustering to the vehicle behaviour data;

providing the clustered vehicle behaviour data based on the continual capturing from the sensor data to a supervised learning prediction model, the prediction model being trained on historical vehicle behaviour data over a past time period, to generate a predicted value of a frequency of expected claim submissions submitted to an entity managing a policy of the policyholder's vehicle in a future time period;

extracting a risk score from the supervised learning prediction model, wherein extracting the risk score comprises:

computing a Shapley estimate value for each feature of the vehicle behaviour data applied to the prediction model for determining a contribution of each said feature to the predicted value, wherein the Shapley estimate value for each said feature is determined by performing a spline approximation to an output of a Shapley function applied to each said feature to estimate the contribution of each said feature, wherein computing the Shapley estimate value comprises:

applying the Shapley function to each said feature relative to all the other features in the plurality of features, the Shapley function providing an average expected marginal contribution of each said feature for generating a Shapley local approximation for each said feature; and applying the spline approximation to the Shapley local approximation to generate a spline representation having a plurality of coefficients defining a spline curve; and computing a sum of the coefficients to generate an output of a sum of the Shapley estimate value for each said feature, retrieving a risk score from a database storing a relationship between the sum of the Shapley estimate value from each said feature and the risk score for the vehicle, and in response to extracting the risk score, responding to the vehicle behaviour data captured from the vehicle's connected electronic and sensor components by:

instructing the mobile device to display the risk score, at least one of the plurality of features contributing to the risk score, associated driving recommendations for the risk score, and a projected discount based on the risk score on a user interface of the risk assessment computer application storing a profile for the policyholder's vehicle for use in subsequent interaction for modifying the risk score; and upon receiving input from the mobile device determining that trip data points have been deleted from the profile associated with the policyholder's vehicle during the data collection period, increasing the risk score thereby modifying a stored log for the vehicle on the server and updating the instruction to the mobile device for the user interface.

2. The server of claim 1, wherein an increased Shapley estimate value for a particular feature indicates a higher contribution of the particular feature in the prediction model thereby a higher risk associated with that particular feature for determining the risk score.

3. The server of claim 1, wherein the prediction model is trained on the historical vehicle behaviour data over the past time period to predict the frequency of the claim submissions in the future time period wherein the past time period is for a same duration of time as the future time period.

4. The server of claim 3, wherein the prediction model is initially trained to use the vehicle behaviour data comprising: a duration of trips and a distance of trips taken by the vehicle over the past time period via a regression model to predict the vehicle behaviour data over the future time period that is correlated with the frequency of the claims submissions in the future time period.

5. The server of claim 1, wherein in response to receiving a plurality of vehicle behaviour data, the actions further comprise:

extracting the features from the vehicle behaviour data, comprising:

a set of frequency features pertaining to a frequency of trips taken by the vehicle within the data collection period;

a set of location features pertaining to a plurality of key locations as determined from trips taken by the vehicle during the data collection period;

a set of driving quality features including driving information pertaining to how the vehicle is being driven as captured from the geo-tracking system; and a set of application features derived from the usage characteristics of interacting with the risk assessment computer application for a profile associated with the policyholder's vehicle.

6. The server of claim 5, wherein the features further comprise:

the frequency features comprising metadata about how often the vehicle is driven, average duration of time that the vehicle is driven on average, average distance travelled by the vehicle on a given trip, and a time at which the trips are taken;

the location features comprising: a source and end destination for each of the trips within the data collection period and most visited location for the vehicle;

the driving quality features comprising: at risk events taken in the trips and average speed occurring within the data collection period; and, the application features comprising the usage characteristics for the risk assessment computer application relating to how often trip data points are deleted from a profile associated with the policyholder's vehicle during the data collection period.

7. The server of claim 6, wherein the actions further comprise:

determining the key locations in the location features extracted for the vehicle by said applying hierarchical clustering wherein a geographical vicinity that the trip starts or ends at most frequently is considered to be a home location for the vehicle, the geographical vicinity that the trip starts or ends at a second most is considered to be a work location.

8. The server of claim 7, wherein the location features are derived by automatically separating a start and end point of each trip within the data collection period into the key locations and averaging a number of trips that start or end at the key locations as one of the vehicle behaviour data which is input into the prediction model.

9. The server of claim 6, wherein the application features for deletion are derived by adding up amount of times trip data was deleted from the risk assessment computer application during the data collection period, and a total distance traveled within deleted trips.

10. The server of claim 1, wherein the risk score is assigned to the data collection period by first assigning a weight to each said feature based on a contribution that that feature has in the prediction model, and then applying a sum to a corresponding weight for each said feature to assign the risk score.

11. The server of claim 1, wherein the prediction model is an extreme gradient boosting model wherein the model is trained in an additive manner using the historical vehicle behaviour data.

12. A computer-implemented method for machine learning, the method comprising:
receiving a plurality of vehicle behaviour data from a mobile device associated with a policyholder's vehicle aggregated over a defined data collection period, the vehicle behaviour data comprising a plurality of features relating to operating the vehicle over a defined data collection period, at least some of the features captured from at least one sensor of a geo-tracking system on the mobile device for continually capturing sensor data relating to the vehicle while the vehicle is being driven, and usage characteristics of a risk assessment computer application, associated with the policyholder's vehicle, on the mobile device in the defined data collection period, the usage characteristics for the risk assessment computer application comprising how often trip data points are deleted from a profile associated with the policyholder's vehicle during the data collection period;
applying hierarchical clustering to the vehicle behaviour data;
providing the clustered vehicle behaviour data based on the continual capturing from the sensor data to a supervised learning prediction model, the prediction model being trained on historical vehicle behaviour data over a past time period, to generate a predicted value of a frequency of expected claim submissions submitted to an entity managing a policy of the policyholder's vehicle in a future time period;
extracting a risk score from the supervised learning prediction model, wherein extracting the risk score comprises:
computing a Shapley estimate value for each feature of the vehicle behaviour data applied to the prediction model for determining a contribution of each said feature to the predicted value, wherein the Shapley estimate value for each said feature is determined by performing a spline approximation to an output of a Shapley function applied to each said feature to estimate the contribution of each said feature, wherein computing the Shapley estimate value comprises:
applying the Shapley function to each said feature relative to all the other features in the plurality of features, the Shapley function providing an average expected marginal contribution of each said feature for generating a Shapley local approximation for each said feature; and
applying the spline approximation to the Shapley local approximation to generate a spline representation having a plurality of coefficients defining a spline curve; and
computing a sum of the coefficients to generate an output of a sum of the Shapley estimate value for each said feature, retrieving a risk score from a database storing a relationship between the sum of the Shapley estimate value from each said feature and the risk score for the vehicle,
and in response to extracting the risk score, responding to the vehicle behaviour data captured from the vehicle's connected electronic and sensor components by:
instructing the mobile device to display the risk score, at least one of the plurality of features contributing to the risk score, associated driving recommendations for the risk score, and a projected discount based on the risk score on a user interface of the risk assessment computer application storing a profile for the policyholder's vehicle for use in subsequent interaction for modifying the risk score; and
upon receiving input from the mobile device determining that trip data points have been deleted from the profile associated with the policyholder's vehicle during the data collection period, increasing the risk score thereby modifying a stored log for the vehicle on the server and updating the instruction to the mobile device for the user interface.

13. The method of claim 12, wherein an increased Shapley estimate value for a particular feature indicates a higher contribution of the particular feature in the prediction model thereby a higher risk associated with that particular feature for determining the risk score.

14. The method of claim 12, wherein the prediction model is trained on the historical vehicle behaviour data over the past time period to predict the frequency of the claim submissions in the future time period wherein the past time period is for a same duration of time as the future time period.

15. The method of claim 14, wherein the prediction model is initially trained to use the vehicle behaviour data comprising: a duration of trips and a distance of trips taken by the vehicle over the past time period via a regression model to predict the vehicle behaviour data over the future time period that is correlated with the frequency of the claims submissions in the future time period.

16. The method of claim 12, wherein in response to receiving a plurality of vehicle behaviour data, the method further comprises:
extracting the features from the vehicle behaviour data, comprising:
a set of frequency features pertaining to a frequency of trips taken by the vehicle within the data collection period;
a set of location features pertaining to a plurality of key locations as determined from trips taken by the vehicle during the data collection period;

a set of driving quality features including driving information pertaining to how the vehicle is being driven as captured from the geo-tracking system; and a set of application features derived from the usage characteristics of interacting with the risk assessment computer application for a profile associated with the policyholder's vehicle.

17. The method of claim 16, wherein the features further comprise:

the frequency features comprising metadata about how often the vehicle is driven, average duration of time that the vehicle is driven, average distance travelled by the vehicle on a given trip, and time at which the trips are taken;

the location features comprising: a source and end destination for each of the trips within the data collection period and most visited location for the vehicle;

the driving quality features comprising: at risk events taken in the trips and average speed occurring within the data collection period; and, the application features comprising the usage characteristics for the risk assessment computer application relating to how often trip data points are deleted from a profile associated with the policyholder's vehicle during the data collection period.

18. The method of claim 17 further comprising:

determining the key locations in the location features extracted for the vehicle by said applying hierarchical clustering wherein a geographical vicinity that the trip starts or ends at most frequently is considered to be a home location for the vehicle, the geographical vicinity that the trip starts or ends at a second most is considered to be a work location.

19. The method of claim 18, wherein the location features are derived by automatically separating a start and end point of each trip within the data collection period into the key locations and averaging a number of trips that start or end at the key locations as one of the vehicle behaviour data which is input into the prediction model.

20. The method of claim 17, wherein the application features for deletion are derived by adding up a number of times trip data was deleted from the risk assessment computer application during the data collection period, and a total distance traveled within deleted trips.

21. The method of claim 12, wherein the risk score is assigned to the data collection period by first assigning a weight to each said feature based on a contribution that that feature has in the prediction model, and then applying a sum to a corresponding weight for each said feature to assign the risk score.

22. The method of claim 12, wherein the prediction model is an extreme gradient boosting model wherein the model is trained in an additive manner using the historical vehicle behaviour data.

* * * * *